(12) United States Patent
Bland

(10) Patent No.: US 6,634,448 B2
(45) Date of Patent: Oct. 21, 2003

(54) RIDING LAWN MOWER WITH IMPROVED RADIATOR SYSTEM

(76) Inventor: Mark Bland, 3705 Glorywoods Ct., New Albany, IN (US) 47150

( * ) Notice: Subject to any disclaimer, the term of this patent is extended or adjusted under 35 U.S.C. 154(b) by 0 days.

(21) Appl. No.: 09/910,121

(22) Filed: Jul. 20, 2001

(65) Prior Publication Data

US 2003/0015361 A1 Jan. 23, 2003

(51) Int. Cl.[7] ............................................. B60K 11/00
(52) U.S. Cl. ................... 180/68.1; 180/68.4; 123/41.01
(58) Field of Search ........................ 180/68.1, 68.2, 180/68.3, 68.4, 68.6; 123/41.01, 41.1, 41.49, 41.12

(56) References Cited

U.S. PATENT DOCUMENTS

| | | | | |
|---|---|---|---|---|
| 1,379,308 A | * | 5/1921 | Marshall | 123/41.02 |
| 4,573,544 A | * | 3/1986 | Hoch et al. | 123/41.66 |
| 4,579,090 A | * | 4/1986 | Konrath et al. | 123/41.02 |
| 4,589,379 A | * | 5/1986 | Fujikawa et al. | 123/41.49 |
| 4,862,981 A | * | 9/1989 | Fujikawa et al. | 180/68.4 |
| 5,113,819 A | * | 5/1992 | Murakawa et al. | 123/198 E |
| 5,199,521 A | * | 4/1993 | Samejima et al. | 180/68.1 |
| 5,207,187 A | * | 5/1993 | Kurohara et al. | 123/41.7 |
| 5,284,115 A | * | 2/1994 | Imanishi et al. | 123/198 E |
| 5,320,190 A | * | 6/1994 | Naumann et al. | 180/68.2 |
| 5,678,648 A | * | 10/1997 | Imanishi et al. | 180/68.1 |
| 5,947,219 A | * | 9/1999 | Peter et al. | 180/68.1 |
| 5,960,899 A | * | 10/1999 | Roach | 180/68.1 |
| 6,105,349 A | * | 8/2000 | Busboom et al. | 180/68.6 |
| 6,390,217 B1 | * | 5/2002 | O'Brien et al. | 160/DIG. 1 |
| 2002/0029912 A1 | * | 3/2002 | MacKelvie | 180/68.1 |

OTHER PUBLICATIONS

Images 1–3 of Bobcat brand Skid Steer Leader in public use prior to Jul. 20, 2000.

* cited by examiner

*Primary Examiner*—Brian L. Johnson
*Assistant Examiner*—Kelly E Campbell
(74) *Attorney, Agent, or Firm*—Woodard, Emhardt, Moriarty, McNett & Henry LLP

(57) ABSTRACT

A riding lawn mower includes a frame; ground engaging wheels mounted with said frame; at least one cutting deck mounted to the frame; an engine mounted to the frame and operatively connected to drive said ground engaging wheels and said at least one cutting deck, said engine has fluid to be cooled; and, a radiator system, the radiator system including: a housing, a radiator having first and second opposing sides, mounted in the housing and operatively connected with said engine to intake fluid at a first temperature from said engine and to output fluid back to said engine at a second temperature, a screen mounted in the housing and adjacent the first side of the radiator, a bi-directional fan mounted in the housing adjacent the second side of the radiator and operable to direct an air flow in a standard direction first through the screen and then through the radiator and operable as desired to direct an airflow in a discharge direction, opposite the standard direction, first through the radiator and then through the screen, and switch means for switching the fan between the standard and discharge directions; and wherein the radiator and fan are mounted above said engine.

1 Claim, 4 Drawing Sheets

RIDING LAWN MOWER WITH IMPROVED RADIATOR SYSTEM

FIELD OF THE INVENTION

The present invention relates to the field of lawn mowers, and more particularly to riding lawn mowers with an improved radiator system including a top mounted radiator and fan assembly and an apparatus for clearing debris from the radiator.

BACKGROUND OF THE INVENTION

Most heavy duty and professional grade riding lawn mowers have water cooled engines that include radiators to transfer the heat away from the circulating water. As is typical in water cooled engines, output pulleys facing forwardly or rearwardly drive one or more belts, which drive pumps, motors and/or compressors. A fan is mounted on the output pulley spindle of one of the pulleys, and the radiator is mounted in planar relation next to the fan so that the fan's output is primarily directed to the radiator.

In one configuration, the mower's engine is mounted so that the pulleys (and fan connected thereto) face forwardly of the engine, and are thereby in an optimal position to couple with a hydraulic system therebelow that drives the rear wheels of the mower. This dictates that the radiator be positioned just forward of the fan and just behind the operator seat. Although the fan directs the air flow rearwardly, away from the back of the seat and toward the radiator, a substantial amount of radiative heat radiates from the radiator toward the seat, creating substantial discomfort for the operator.

A consequence of drawing air flow through the radiator in a riding lawn mower is a build up of grass clippings and related debris on the intake side of the radiator. It is desired to minimize the overall length of the mower, and the radiator is therefore positioned fairly closely to the back of the operator seat. This makes it awkward and somewhat difficult to clear the debris from the intake side of the radiator. In some designs, the operator seat is hingedly mounted to the mower frame and may be pivoted away from the radiator. The debris may then be cleared from the radiator by hand or broom or similar implement, although other supporting structure and mower components may still partially obstruct the radiator and make cleaning difficult. Any debris not cleared from the intake side of the radiator decreases the air flow volume that can be drawn across the radiator, thereby decreasing the radiator's heat transfer rate. In short, the engine is caused to run hotter, which lowers the engine's efficiency and longevity.

What is needed is an improved radiator system for a water cooled riding lawn mower.

SUMMARY OF THE INVENTION

Generally speaking, a riding lawn mower with a water cooled engine includes a radiator system mounted above the engine and with an apparatus for discharging debris that accumulates on the intake screen to the radiator.

A riding lawn mower includes a frame; ground engaging wheels mounted with the frame; at least one cutting deck mounted to the frame; an engine mounted to the frame and operatively connected to drive the ground engaging wheels and the at least one cutting deck, the engine having fluid to be cooled; and, a radiator system. The radiator system includes a housing; a radiator having first and second opposing sides, mounted in the housing and operatively connected with the engine to intake fluid at a first temperature from the engine and to output fluid back to the engine at a second temperature; a screen mounted in the housing and adjacent the first side of the radiator; a bidirectional fan mounted with the housing adjacent the second side of the radiator and operable to direct an air flow in a standard direction first through the screen and then through the radiator and operable as desired to direct an airflow in a discharge direction, opposite the standard direction, first through the radiator and then through the screen; and switch circuitry for switching the fan between the standard and discharge directions; and, wherein the radiator and fan are mounted above the engine.

It is an object of the present invention to provide an improved riding lawn mower with water cooled engine.

It is another object of the present invention to provide an improved radiator system for a riding lawn mower with water cooled engine.

Other objects and advantages of the present invention will become apparent from the following description of the preferred embodiment.

DESCRIPTION OF THE PREFERRED EMBODIMENT

Figure 1:
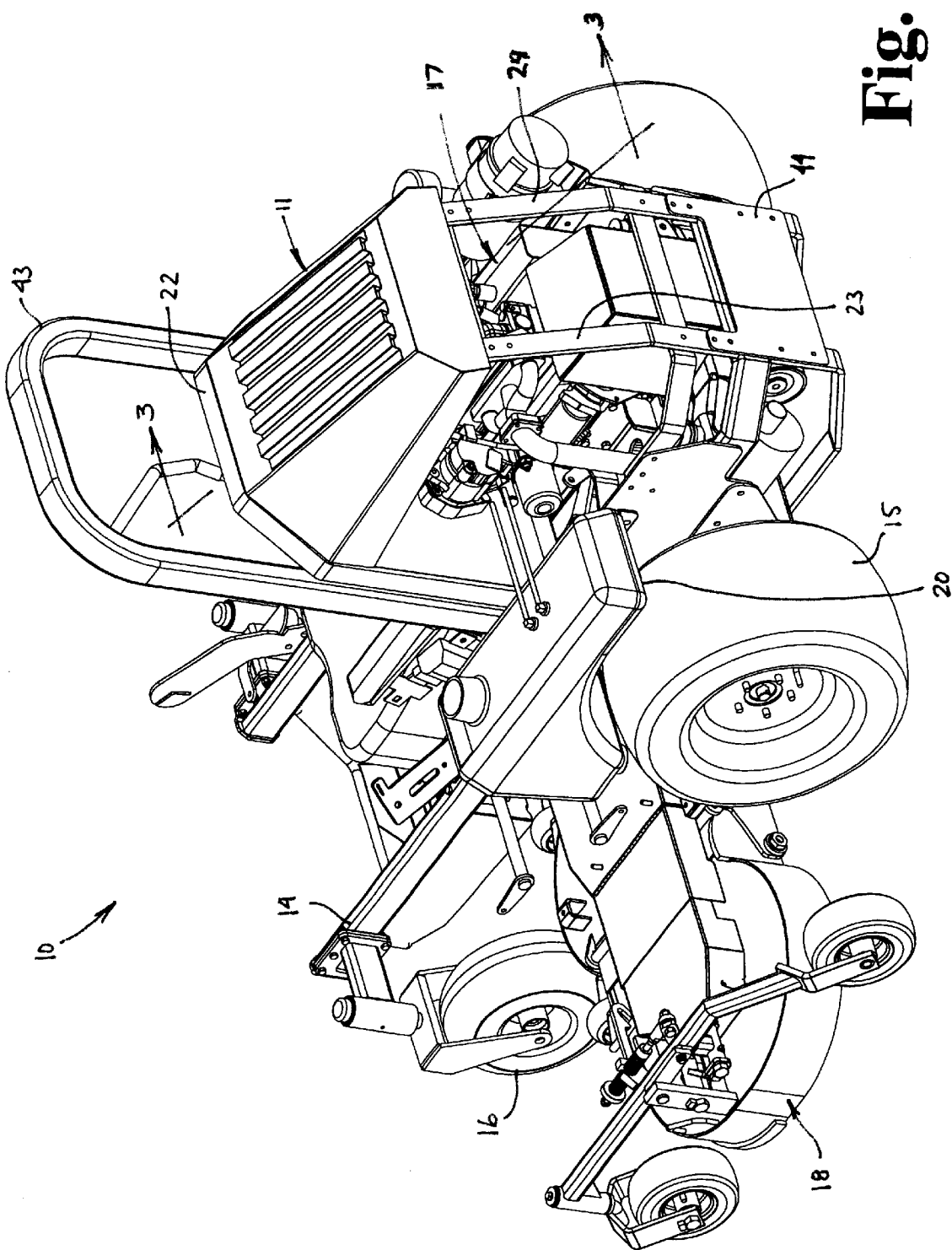
FIG. 1 is a rear perspective view of a riding lawn mower 10 with radiator system 11 in accordance with the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and that any alterations or modifications in the illustrated device, and any further applications of the principles of the invention as illustrated therein are contemplated as would normally occur to one skilled in the art to which the invention relates.

Figure 2:
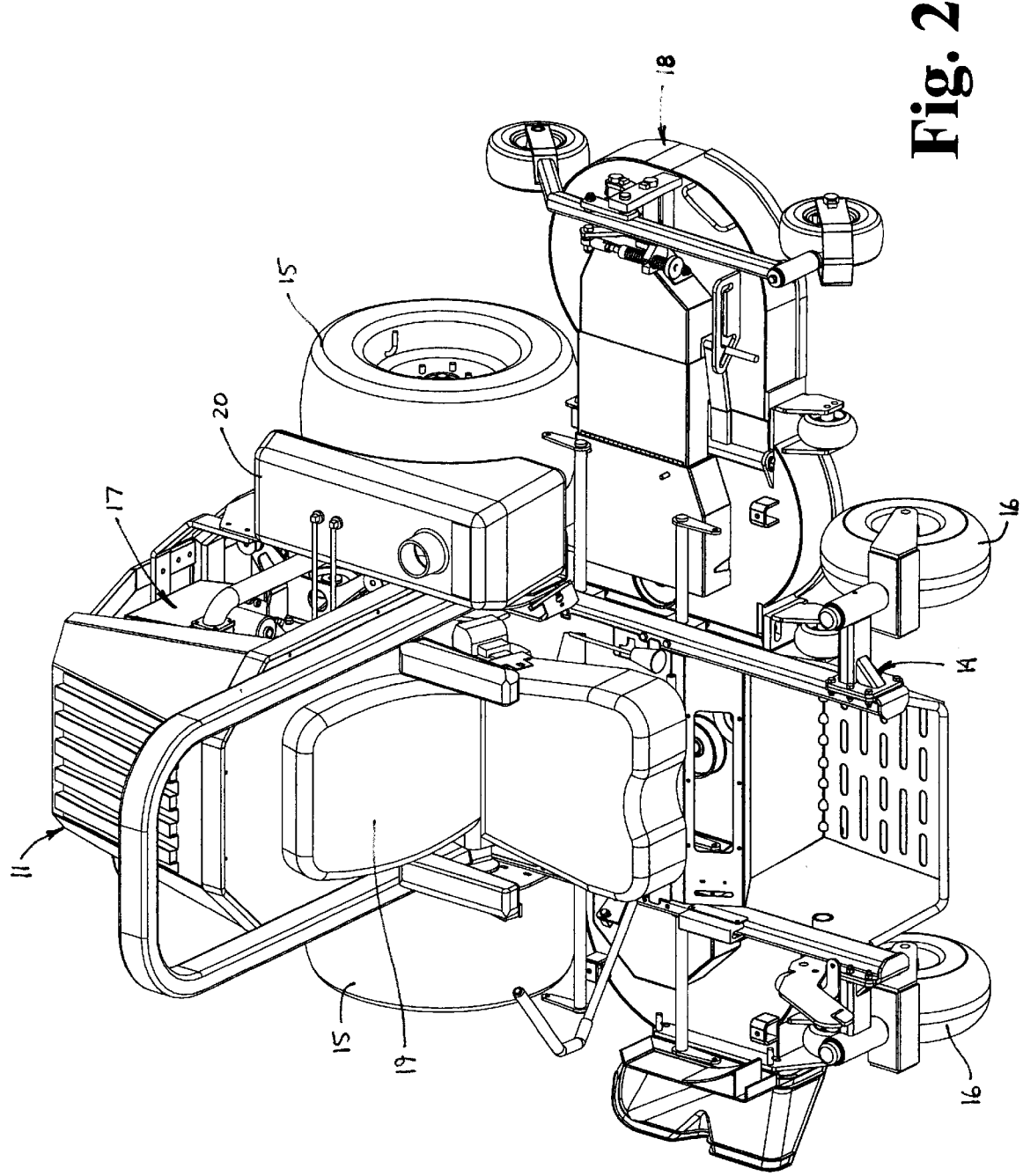
FIG. 2 is a front perspective view of the riding lawn mower 10 of FIG. 1.

Referring now to FIGS. 1 and 2, there is shown a riding lawn mower 10 with radiator system 11 in accordance with the preferred embodiment of the present invention. As with known riding lawn mowers, mower 10 generally includes a frame 14, rear wheels 15, front wheels 16, a water cooled engine 17, one or more cutting decks 18, an operator seat 19, gas tank 20, and various other controls and attachments. Engine 17 is water cooled and, as such, employs a radiator to transfer heat away from water circulating through passageways defined in engine 17. Such radiator is contained within radiator system 11, which is disposed above engine 17 and behind operator seat 19.

Figure 3:
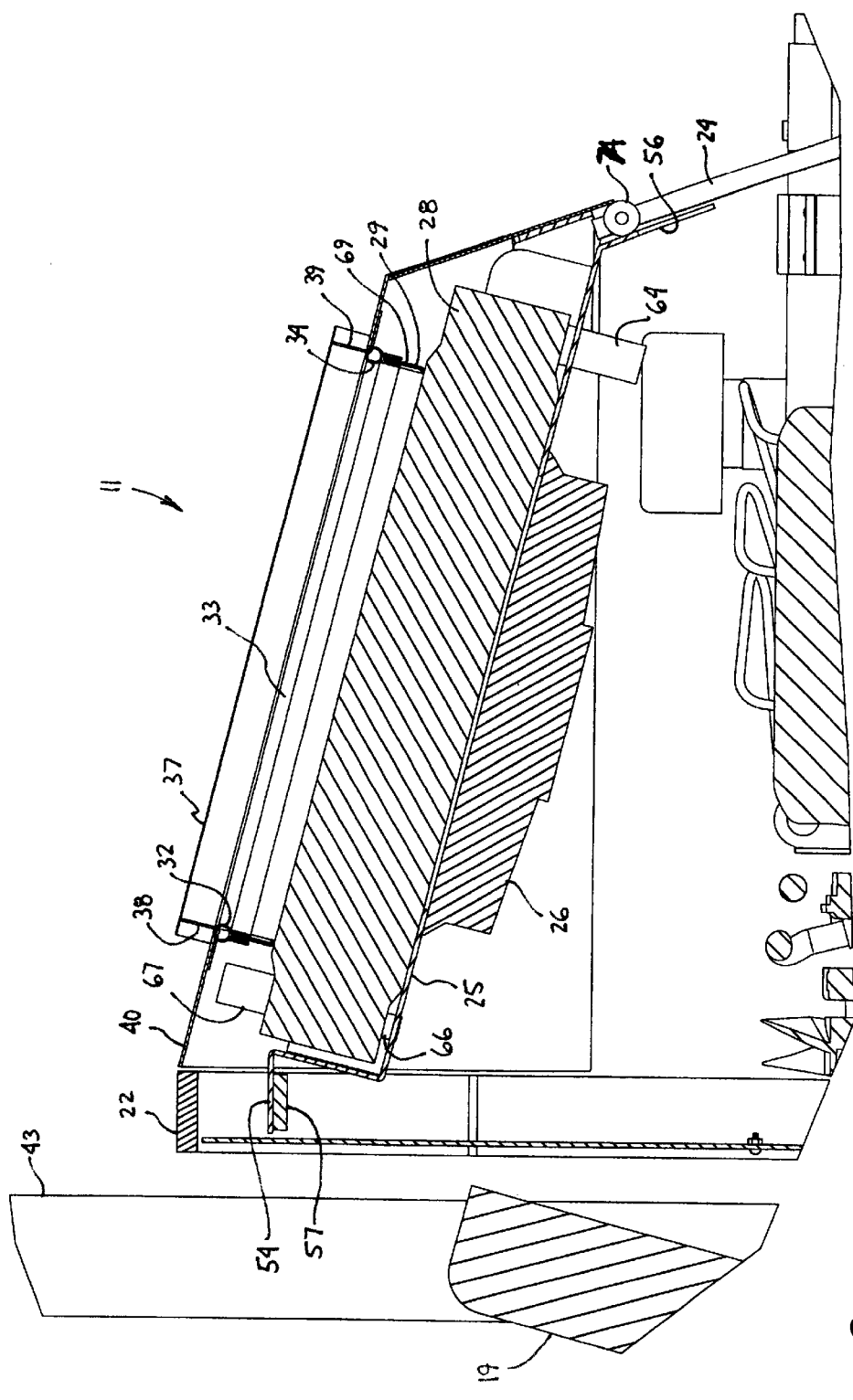
FIG. 3 is a side cross-sectional view of the radiator system 11 of the mower 10 of FIG. 1.
Figure 4:
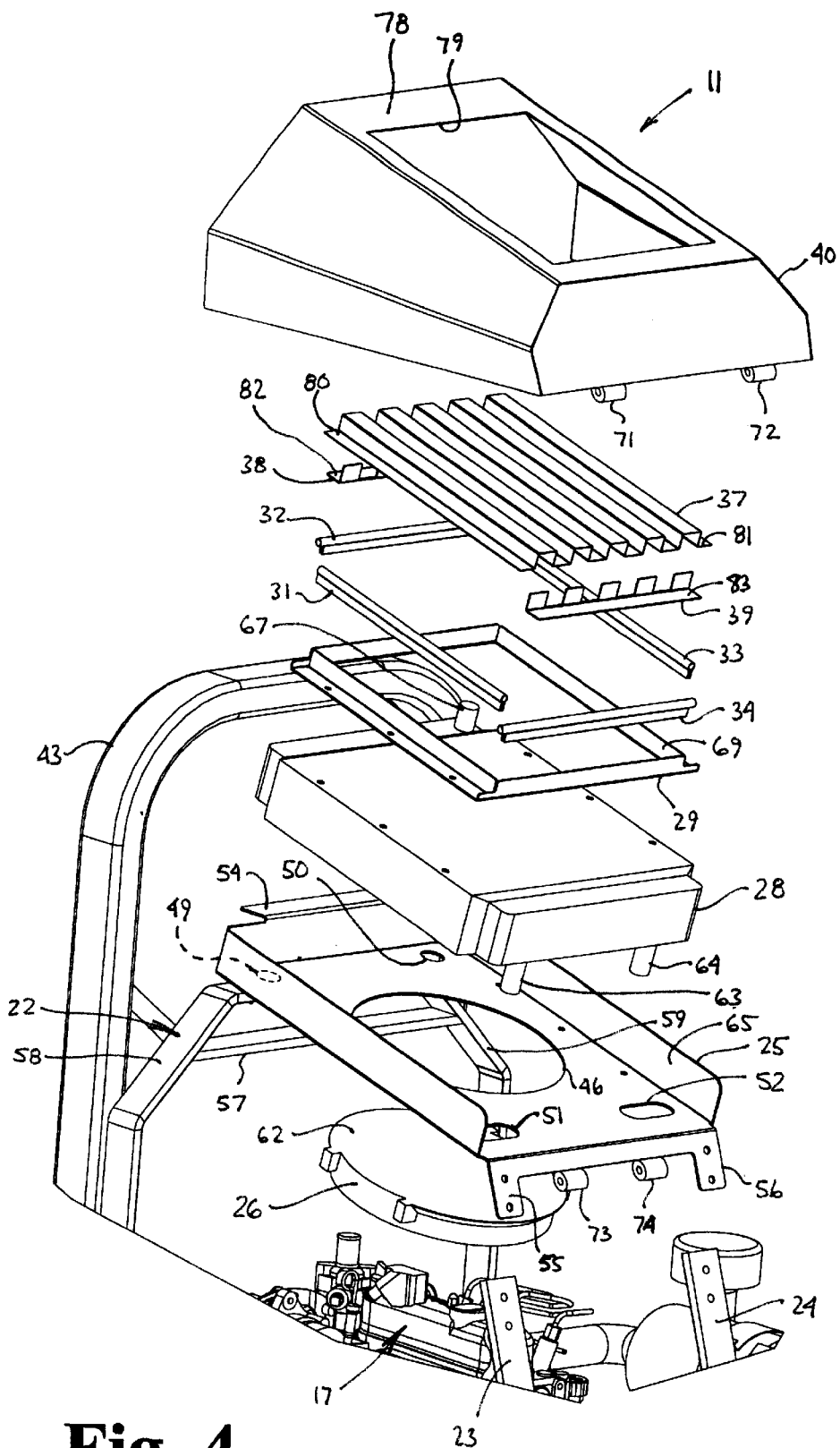
FIG. 4 is an exploded perspective view of the radiator system 11 of the mower 10 of FIG. 1.

Referring now to FIGS. 1 through 4, radiator system 11 is mounted to mower frame 14 via front frame member 22 and rear frame members 23 and 24, and generally includes radiator mounting pan 25, fan unit 26, radiator 28, guide channel 29, gaskets members 31 through 34, debris screen 37, end caps 38 and 39, and cover 40. Front frame member 22 is generally arched-shaped as seen in FIGS. 1 and 4 and is fixed to mower frame 14 directly behind the mower frame roll bar 43 and operator seat 19 by appropriate means such as bolts (not shown). Rear frame members 23 and 24 are fixed at their lower ends to rear mower frame plate 44 and extend upwardly therefrom, as shown.

Radiator mounting pan 25 includes a floor 45 that defines a central fan opening 46 along with four radiator input/output openings 49–52. Mounting pan 25 further includes a forwardly extending mounting flange 54 and a pair of rearwardly extending mounting flanges 55 and 56. A mounting plate 57 extends between the angled portions 58 and 59 of front frame member 22, as shown, and is connected thereat by appropriate means, such as welding. The forward mounting flange 54 of mounting pan 25 is connected to mounting plate 57 with appropriate fasteners such as screws (not shown), and rear mounting flanges 55 and 56 are connected to the upper ends of rear frame members 23 and 24 using appropriate fasteners such as screws (not shown).

Fan 26 is mounted to the underside of radiator mounting pan 25 by appropriate means such as screws in a position to direct airflow through central fan opening 46. The fan unit 26 depicted in FIG. 4 is representative of any appropriate electrically powered fan. In one embodiment, fan 26 is a 12 v, 12 inch electric engine cooling fan commercially available from most automotive parts suppliers. Fan 26 is capable of directing an airflow in a direction roughly perpendicular to the representative surface 62 of fan 26. Fan 26 is capable of drawing air downwardly through central fan opening 46 and toward engine 17, and is further capable of having its direction reversed whereby it draws air from below, up through central fan opening 46 and toward radiator 28.

A radiator is shown represented at 28 and is sized to accommodate the cooling capacity desired by engine 17, and mounting pan 25 is sized and shaped to receive radiator 28 within its upstanding walls 65. Radiator 28 includes input and output ports 63 and 64 which extend through corresponding openings 51 and 52 of pan 25 and connect with the remainder of the water based cooling system of engine 17. Radiator 28 is also designed to connect with and cool the circulating hydraulic fluid of the mower's hydraulic drive system and includes oil input and output ports, one of which is shown at 66 (FIG. 3). The oil input and output ports extend through the corresponding input and output openings 49 and 50 in radiator mounting pan 25. Radiator 28 includes a fluid fill access port 67. Radiator 28 is stabilized by connecting it to radiator mounting pan by any appropriate means such as nuts and bolts (not shown).

Guide channel 29 includes an upstanding, rectangular-shaped flange 69, and the four gasket members 31–34 are firmly received over each the four sides of upstanding, rectangular-shaped flange 69 to form a substantially continuous rectangular seal.

Debris screen 37 consists of a substantially rectangular sheet of metal screen or perforated metal, the sheet having a series of mutually parallel right angle bends to form a rigid, generally rectangular screen, as shown. Debris screen 37 could be made of any appropriate material and in any desired configuration so long as it has a pore size small enough to filter out the desired debris (grass clippings, dirt clumps, rocks, sticks, etc.), but large enough to permit sufficient air flow to maintain effective cooling action in radiator 28. End caps 38 and 39 are shaped substantially as shown to close off the open ends of debris screen 37. End caps 38 and 39 are not perforated, but could be if desired. The ridges created by the series of right angle bends of debris screen 37 more than double the surface area of the screen and decrease the rate at which accumulating debris blocks airflow through the screen.

Cover 40 includes a pair of hinge sleeves 71 and 72 that align coaxially just to the outside with hinge sleeves 73 and 74 located on the rear, bottom edge of radiator mounting pan 25. Hinge pins extend through each pair of mating hinge sleeves 71/73 and 72/74, and cover 40 is thereby hingedly connected to mounting pin 25. Cover 40 has an upper surface 78 that defines a rectangular opening sized to receive debris screen 37 therethrough. The opposing outer, rectangular strips 80 and 81 of debris screen 37 act as mounting flanges for screen 37, and likewise, end caps 38 and 39 have rectangular mounting flanges 82 and 83. The mounting flanges 80–83 are connected up against the under side of upper surface 78 of cover 40 so that the remaining portions of debris screen 37 and end caps 38 and 39 extend up through opening 78, as shown in FIG. 3. Debris screen 37 and end caps 38 and 39 are connected with cover 40 by appropriate means such as pop rivets, screws or clips. Cover 40, guide channel 29 and gasket members 31–34 are sized and configured so that when cover 40 is hingedly closed (as seen in FIG. 3) the under side of mounting flanges 80–84 engage with and form a seal with gasket members 31–34.

In operation, fan 26 is operated to draw air flow down through debris screen 37, guide channel 29, radiator 28, central fan opening 46 and through fan 26. With the intake for the airflow to radiator 28 at nearly the highest point possible of mower 10, the rate of collection of debris against the debris screen 37 is reduced. Further, the increased surface area of debris screen 37 decreases the rate at which the screen is clogged as debris accumulates.

Fan 26 is bi-directional. That is, the direction of the fan blade of fan 26 can be reversed either by changing polarity of the electrical input to fan 26 or by activating a direction reversal switch that is part of fan 26 or is externally connected to fan 26. Such circuitry is contemplated to be operated manually at the fan 26, at a place proximal and more convenient to an operator sitting in operator seat 19, and/or incorporated into the ignition system of mower 10. Such connection with the ignition system is contemplated to include operation whereby, sometime immediately at or shortly after startup of mower 10, fan 26 is operated in the reverse, discharge direction for a preset period of time, e.g. 10 seconds, and then is either stopped or is reversed to run in the standard direction. In operation then, when mower 10 is started, fan 26 operates in the reverse, discharge direction which directs airflow from below fan 26 up through opening 46, radiator 28, guide channel 29 and through screen 37. The effect is to direct a blast of air through screen 37 which clears the majority of debris collected thereon, thereby permitting nearly unrestricted airflow through radiator system 11 during normal operation. After the preset discharge blast (e.g. 10 seconds), the direction of fan 26 is automatically changed back to its standard operation direction, that is, down through screen 37, radiator 28 and through fan 26. In addition to the automatic discharge blast activated at startup, it is further contemplated that radiator system 11 enable the operator to manually run fan 26 in the discharge direction at any time during operation should debris screen 37 accumulate too much debris, that is, the screen becomes so clogged that the air flow becomes significantly blocked and cooling efficiency of radiator 28 is significantly reduced. Such manual discharge fan operation is contemplated to include a switch that, upon activating, simply runs the fan in the reverse, discharge direction until the switch is turned off. Alternatively, such switch could be made to be activated or depressed, the result being a running of the fan in the reverse, discharge direction for just a preset amount of time (e.g. 10 seconds), such operation constituting a discharge blast.

The electrical circuitry is further contemplated to include a temperature sensor coupled with radiator 28 to activate fan 26 in the standard direction whenever the temperature of the coolant exceeds a preset value. The electrical components and connections to permit fan 26 to be run in the standard direction and to be reversed automatically and/or manually, at mower startup and/or during normal operation, and/or for as long as the switch is activated or for a preset time (a blast period) is not disclosed herein and is believed to be within the knowledge of one skilled in the art.

The drawings presented in FIGS. 1–4 are for illustration purposes, and it is to be understood that elements unnecessary to the present invention may not be shown or may be omitted to permit a clearer view of other components, such omitted elements including fasteners, linkages, fittings, and so on. Also, some components are shown as representative elements and without detail. For example, radiator 28 and fan 26 are shown generally in outline form, it being understood that radiator 28 has cooling fins, and fan 26 has a fan blade, spindle, electric wires, and so on. Also for example, input and output ports 63 and 64 of radiator 28 are not shown connected with the cooling passageways of engine 17, it being understood that such connections exist as is standard with water cooled engines having radiators.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. A riding lawn mower, comprising:

a frame;

ground engaging wheels rotatably mounted with said frame;

at least one cutting deck mounted to the frame;

an engine mounted to the frame and operatively connected to drive said ground engaging wheels and said at least one cutting deck, said engine has fluid to be cooled;

a radiator system including:
   a housing;
   a radiator having first and second opposing sides, mounted in the housing and operatively connected with said engine to intake fluid at a first temperature from said engine and to output fluid back to said engine at a second temperature,
   a screen mounted in the housing and adjacent the first side of the radiator;
   a bi-directional fan mounted with the housing adjacent the second side of the radiator and operable to direct an air flow in a standard direction first through the screen and then through the radiator and operable as desired to direct an airflow in a discharge direction, opposite the standard direction, first through the radiator and then through the screen; and,
switch means for switching the fan between the standard and discharge directions.

* * * * *